(12) United States Patent
Aguilar

(10) Patent No.: US 6,679,311 B2
(45) Date of Patent: Jan. 20, 2004

(54) MAGNETIC SUN SHADE SYSTEM

(76) Inventor: Alfonso Aguilar, 904 Bolivia St., El Paso, TX (US) 79903

( * ) Notice: Subject to any disclaimer, the term of this patent is extended or adjusted under 35 U.S.C. 154(b) by 0 days.

(21) Appl. No.: 10/038,363

(22) Filed: Jan. 7, 2002

(65) Prior Publication Data

US 2003/0127200 A1 Jul. 10, 2003

(51) Int. Cl.[7] .................................................. B60J 3/02
(52) U.S. Cl. ............................ 160/370.21; 160/368.1; 296/97.6
(58) Field of Search ...................... 160/370.21, 368.1, 160/90; 296/97.9, 97.2, 97.3, 97.6, 97.7

(56) References Cited

U.S. PATENT DOCUMENTS 4,248,474 A * 2/1981 Mandrick .................. 296/97.6
4,861,091 A * 8/1989 Wallen ...................... 296/97.6
5,699,631 A * 12/1997 Tyson ......................... 40/621

* cited by examiner

Primary Examiner—Blair M. Johnson
(74) Attorney, Agent, or Firm—Robert Sassone

(57) ABSTRACT

The present invention is a system for shading the eyes which improves on the prior art in that it comprises a Ferromagnetic screen through which light can pass and at least one thin magnet which is coupled to the screen and moved to different locations on the screen as needed in order to shade the eyes of the driver and/or passengers. When the magnet no longer shades the eyes as desired, it is very simple to merely slide it to a more appropriate location on the screen.

2 Claims, 2 Drawing Sheets

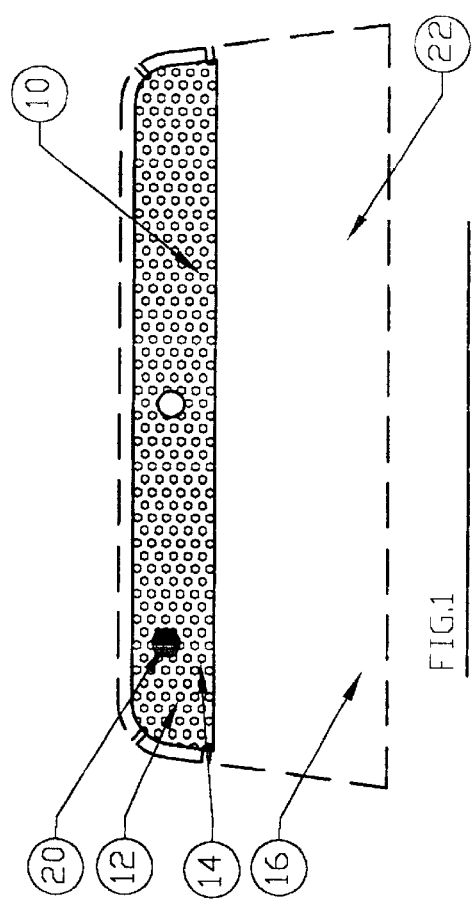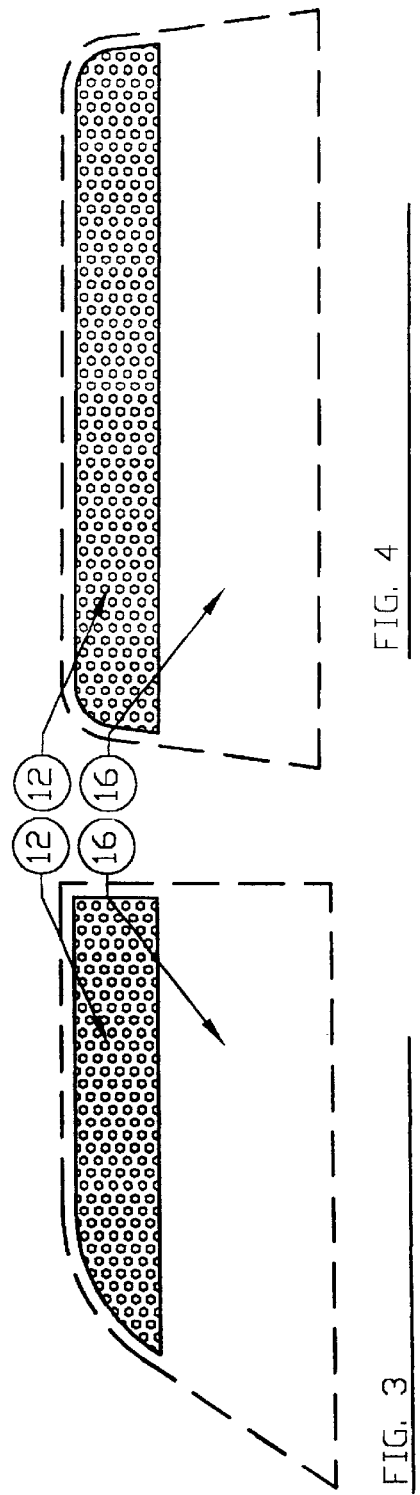

MAGNETIC SUN SHADE SYSTEM

BACKGROUND OF THE INVENTION

1. Field of the Invention

The present invention relates to moveable, magnetically coupled light shades, particularly for use in vehicles such as automobiles.

2. Description of the Prior Art

Imagine a disabled lady who is very short. When she drives into the sun, it shines in her eyes. The bottom of the visor is frequently at a point too high to shade her eyes when the sun is low. The best solution of the prior art is to hang a folded newspaper across the sun visor, thereby extending the area shaded downward. This sometimes but not always works. Unfortunately, it always reduces the areas of the driver's vision.

Many drive roads which change directions as they wind and curve. When driving at certain times and directions on certain roads, the sun repeatedly switches relative positions from the front window to the front of the driver's side window. The driver has to frequently switch the visor from front to side and back to front.

These two examples illustrate just two of the many problems left unsolved by today's state of the art visors which are effective only some of the time in giving the driver the relief from sun light in the eyes that is sought.

Accidents some times are caused by these and other defects in the sun visors now used in cars.

What is needed but apparently not illustrated in the prior art is a means of shading at least one, and in some situations a plurality of selected areas which shading means can be moved more easily and with greater effect than the prior art as the relative position of the sun or other source moves.

SUMMARY OF THE INVENTION

The present invention comprises a system for shading the eyes of drivers and passengers and other selected areas from unwanted sunlight or other light. The term sunlight includes all types of unwanted light.

The invention comprises an at least partially transparent Ferro-magnetic screen covering the area through which unwanted light may come. Since the screen is at least partially transparent, of course, the light normally passes through the screen, and one can see through it. The screen may comprise glass with Ferro-magnetic material in it or near it. Alternatively, the Ferro-magnetic screen may be a glassless screen of any of the types known to the prior art, which allow sufficient light to pass therethrough so as not to reduce the safety of a driver driving and controlling the vehicle via information derived from light passing through the screen.

Since the screen allows light to pass therethrough, it is necessary to couple opaque to light means to the screen to cut off unwanted light.

At least one opaque to light, light in weight magnet means, powerful enough magnetically to removably magnetically couple to any selected area of the screen, remains coupled to substantially the same place on the screen in spite of normal forces exerted on the magnet due to driving, vibrations, accelerations, etc. The magnet, when coupled to the screen, has a cross-section large enough to shade a selected area such as the driver's eyes from sunlight.

In a second example of the invention, there are a plurality of magnet means coupled at selected locations on the screen to cut off sunlight when the vehicle changes direction, thereby changing the relative position of the sun. The magnets can be thin to reduce their cost and weight, and should be relatively easy to grasp and relocate on the screen. The screen may be retrofitted to a previously constructed automobile over selected areas such as the top of the front window. The screen may be any of the prior art screens capable of coupling magnetically to a magnet.

DRAWING DESCRIPTION

Reference should be made at this time to the following detailed description which should be read in conjunction with the following drawings of which:

FIG. 1 illustrates a front window of a vehicle having a screen disposed along the top of the window and having a magnet coupled to the screen;

FIG. 3 illustrates a side window having a screen according to the present invention; and FIG. 4 illustrates a rear window having a screen according to the present invention.

DETAILED DESCRIPTION OF THE INVENTION

Figure 2:
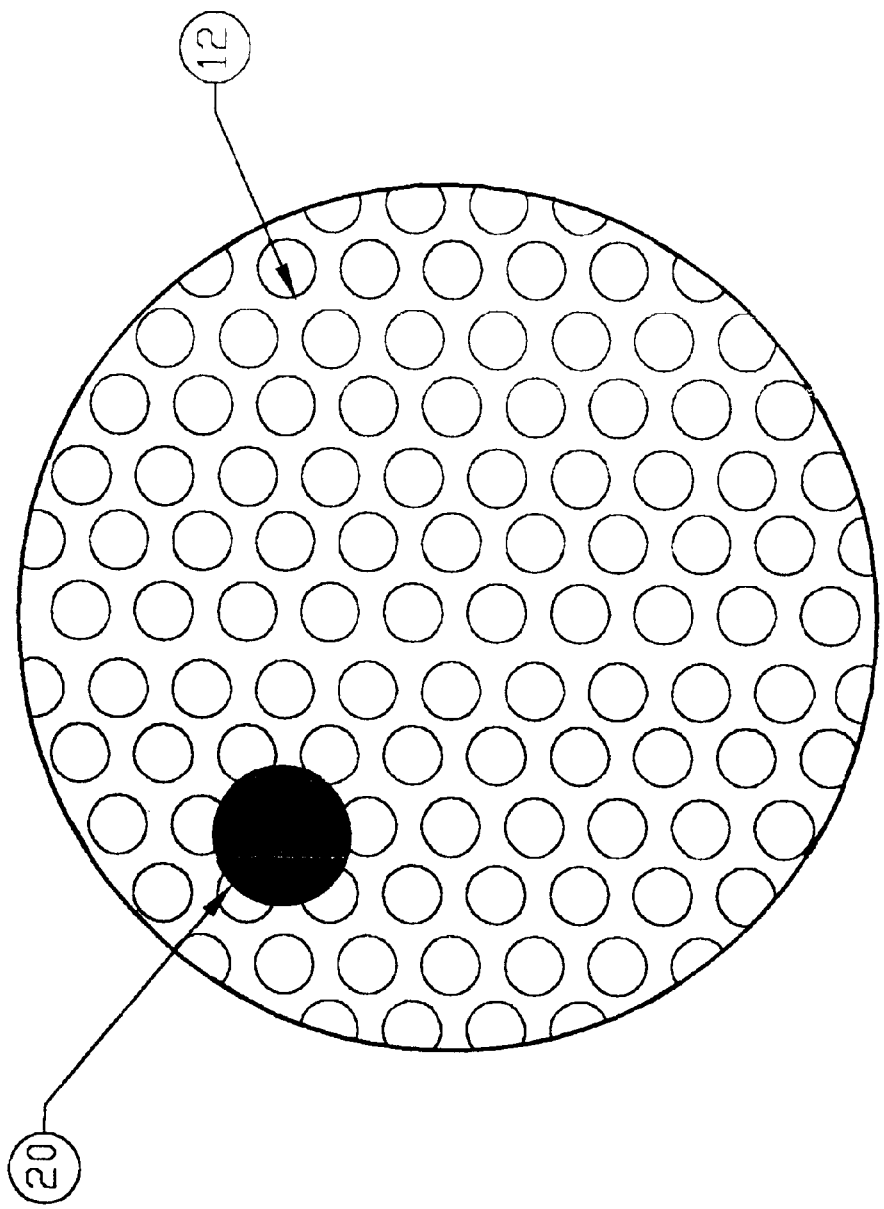
FIG. 2 illustrates one example of a screen which may be used as an element of the present invention.

The present invention comprises a system 10 for shading the eyes of drivers and passengers, (not shown) and other selected areas from unwanted sunlight (not shown) or other light. The term sunlight includes all types of unwanted light.

The system 10 comprises an at least partially transparent Ferro-magnetic screen 12 covering the area 14 through which unwanted light may come. Since the screen 12 is at least partially transparent, of course, the light normally passes through the screen 12, and one can see through it. The screen 12 may comprise glass with Ferro-magnetic material in it or near it (not shown). Alternatively, the screen 12 may be a glassless screen 12 of any of the types known to the prior art, which allow sufficient light to pass therethrough so as not to reduce the safety of a driver (not shown) driving and controlling the vehicle 16 (shown in part) via information derived from light passing through the screen 12.

Since the screen 12 allows light to pass therethrough, it is necessary to couple opaque to light means 20 to the screen 12 to cut off unwanted light.

At least one opaque to light, light in weight magnet means 20, powerful enough magnetically to removably magnetically couple to any selected area of the screen 12, remains coupled to substantially the same place on the screen 12 in spite of normal forces exerted on the magnet 20 due to driving, vibrations, accelerations, etc. The magnet 20, when coupled to the screen 12, has a cross-section large enough to shade a selected area such as the driver's eyes from sunlight.

In a second example of the invention, there are a plurality of magnet means 20 coupled at selected locations on the screen to cut off sunlight when the vehicle changes direction, thereby changing the relative position of the sun. The magnets 20 can be thin to reduce their cost and weight, and should be relatively easy to grasp and relocate on the screen 12. The screen 12 may be retrofitted to a previously constructed automobile over selected areas such as the top of the front window 22 or the top, open part (not shown) of a vehicle like a convertible (not shown). The screen 12 may be any of the prior art screens 12 capable of coupling magnetically to a magnet 20. FIG. 2 illustrates one example of such prior art screens 12.

The present invention 10 is a system 10 for shading the eyes (not shown) which improves on the prior art in that it comprises a Ferro-magnetic screen 12 through which light can pass and at least one thin magnet 20 which is coupled to the screen 12 and moved to different locations on the screen 12 as needed in order to shade the eyes of the driver and/or passengers (not shown). When the sun moves or the vehicle changes direction so that the magnet 20 no longer shades the eyes as desired, it is very simple to merely slide the magnet 20 to a more appropriate location on the screen 12.

A particular example of the invention has been described as required by US Code. Other examples within the scope of the present claims will be obvious to those skilled in the art. The invention is limited only by the following claims.

What is claimed is:

1. A system for shading eyes from unwanted light such as sunlight in a volume such as the inside of a vehicle such as an automobile, comprising:

an at least partially transparent Ferro-magnetic screen attached to and covering the area through which unwanted light is expected to come;

at least one magnet removably coupled to the screen, each magnet being substantially smaller in area than said screen and light enough and powerful enough magnetically, to remain coupled to the same place on the screen during normal accelerations, each magnet having a large enough cross section to shade selected areas.

2. The invention of claim 1 wherein there are at least two of said magnets, and the screen is metallic and cuts off most light passing there through, the screen being located on a top portion of the window.

* * * * *